April 26, 1938.    H. TAYLOR    2,115,349

ADJUSTABLE RIM FOR VULCANIZING MOLDS

Filed Jan. 8, 1936

Inventor
Harry Taylor

BY Eugene _____ and
Fetherstonhaugh & Co. Attys.

Patented Apr. 26, 1938

2,115,349

UNITED STATES PATENT OFFICE 2,115,349

ADJUSTABLE RIM FOR VULCANIZING MOLDS

Harry Taylor, Rushcutters Bay, near Sydney, New South Wales, Australia

Application January 8, 1936, Serial No. 58,210
In Australia January 21, 1935

3 Claims. (Cl. 18—18)

This invention relates to rims which are used for mounting the tires of motor vehicles upon for retreading in a vulcanizing mold.

The invention has been specially devised to provide cheap, simple and effective rims readily adjustable for the mounting of different sizes of tires thereupon, particularly tires of different widths, thus obviating the need for a separate rim for each different size and rendering the removal of the tire an easy operation.

According to this invention the rim is made in two circular side parts adapted to be overlapped or telescoped in the well, depression, or cavity, wherein the beads or edges of the tire and the usual air bag fit, and the rim parts are adapted to be adjusted laterally for width variations by moving them together or apart with the overlapped portions sliding one upon the other. Slide or guide devices are provided at suitable intervals around the rim parts to keep them aligned during adjustment and to provide bearings for the said parts to easily slide upon, and there are locking devices for retaining said parts at a desired setting.

In order to more fully describe this invention reference will be had to the drawing accompanying and forming part of this complete specification, and wherein:—

Fig. 2 is an assembled perspective while,

Figure 3:
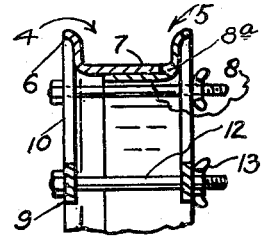
Fig. 3 is an enlarged cross section.
Figure 1:
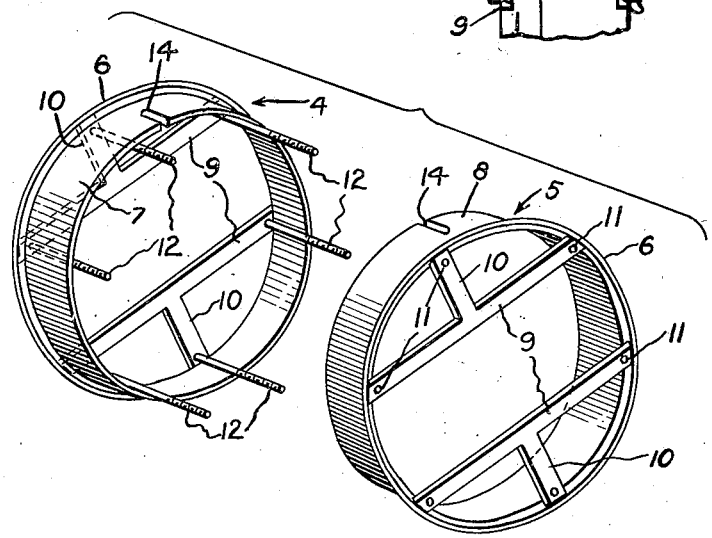
Fig. 1 is an exploded perspective of the rim according to the invention.

The rim consists of two circular side parts 4 and 5, each having a side rim flange 6 and a well flange respectively numbered 7 and 8, the said well flange 7 being adapted to overlap its fellow 8 and to slide thereupon as the rim parts 4 and 5 are advanced together or retired apart. The well flange 8 (Fig. 3) is formed to provide an annular shoulder 8a on the upper surface thereof. This flange 8a supports one bead of the tire to maintain the bead at the same height as the bead supported upon the flange 7 and prevents said first bead from being pinched between the free edge of the flange 7 and the rim flange 6 of the member 5 when the members 4 and 5 are moved together. The rim flange 6 and the junction with the well flanges may be contoured or shaped inwardly according to the bead or edging of the tires to be treated.

Each of the rim parts 4 and 5 has a side frame formed of two side bars 9 affixed by welding or other suitable means across the outside edge in parallel relationship as chords so positioned that equal segments are formed, and a stay bar 10 preferably formed integral therewith extends about medially of the length thereof and at or about right angles thereto to the rim flange 6 and is thereto affixed by welding.

The side frames 9—10 have bolt holes 11 provided therein through which adjusting bolts 12 pass to draw the rim parts 5 and 6 together and for spacing them apart and for locking in adjusted position.

A slot 14 is provided in the well flanges 9 and 10 for the valve of the air bag to pass through.

Figure 2:
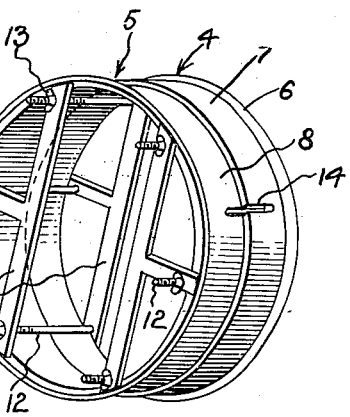

In use a tire to be retreaded is mounted upon the rim 4—5 with the usual air bag in position, the said rim parts 4—5 being separated while the said tire is placed upon the part 4, with one side bead of the tire taking against the rim flange 6. The part 5 is then placed in position with its well flange 8 sliding in under the well flange 7, the bolt holes 11 being threaded over the bolts 12 projecting from the side frames 10 of rim parts 5 and the two said parts being aligned as shown in Fig. 2, the other side bead of the tire taking against the rim flange 6.

Nuts 13 preferably of wing headed form are then threaded on the bolts 12 and tightened to suitably adjust the rim parts 4—5 to the size of tire.

The retreaded tire is easily and quickly removed on removing the nuts 13 and lifting the rim part 5 out of the way when the said tire is pulled off the well flange 7 of the other rim part 4.

In some constructions the bolts 12 may be fast in the frames 9—10 of the rim part 5.

I claim:—

1. An adjustable tire rim for vulcanizing molds comprising two separable portions, each of said portions having a flange for engaging one tire bead and each being provided with a slot for passage of the inner tube valve but being otherwise circumferentially continuous across its whole width, said flanges being formed to telescope with each other, the inner of said flanges being formed with an annular shoulder for supporting a tire bead on a level with the surface of the outer flange, at least one brace bar extending across each rim portion at its flanged side, the bar in one rim portion carrying bolts and that in the other portion having holes to receive such bolts.

2. An adjustable tire rim for vulcanizing molds comprising two separable portions, each of said portions having a flange for engaging one tire bead and each being provided with a slot for passage of the inner tube valve but being otherwise circumferentially continuous across its whole width, said flanges being formed to telescope with each other, the inner of said flanges being formed with an annular shoulder for supporting a tire bead on a level with the upper surface of the outer flange, means for internally bracing said portions and means for adjustably connecting said portions together.

3. An adjustable tire rim for vulcanizing molds comprising two separable portions, each of said portions having a flange for engaging one tire bead, said flanges being formed to telescope with each other, the inner of said flanges being formed with an annular shoulder for supporting a tire bead on a level with the upper surface of the outer flange, means for internally bracing said portions and means for adjustably connecting said portions together.

HARRY TAYLOR.